United States Patent
Lotter

(10) Patent No.: US 10,667,210 B2
(45) Date of Patent: May 26, 2020

(54) LOW POWER CELLULAR BASE STATION

(71) Applicant: Nextivity, Inc., San Diego, CA (US)

(72) Inventor: Michiel Petrus Lotter, San Diego, CA (US)

(73) Assignee: NEXTIVITY, INC., San Diego, CA (US)

( * ) Notice: Subject to any disclaimer, the term of this patent is extended or adjusted under 35 U.S.C. 154(b) by 0 days.

(21) Appl. No.: 16/029,378

(22) Filed: Jul. 6, 2018

(65) Prior Publication Data

US 2019/0075516 A1    Mar. 7, 2019

Related U.S. Application Data

(60) Provisional application No. 62/530,023, filed on Jul. 7, 2017.

(51) Int. Cl.
*H04W 52/02* (2009.01)
*H04B 7/155* (2006.01)
*H04W 84/04* (2009.01)

(52) U.S. Cl.
CPC .... *H04W 52/0206* (2013.01); *H04B 7/15557* (2013.01); *H04W 52/0203* (2013.01); *H04W 52/0216* (2013.01); *H04W 84/047* (2013.01)

(58) Field of Classification Search
CPC .......... H04B 7/15557; H04W 52/0203; H04W 52/0206; H04W 52/0216; H04W 84/047
USPC ......................................................... 370/315
See application file for complete search history.

(56) References Cited

U.S. PATENT DOCUMENTS

| | | | |
|---|---|---|---|
| 2003/0105983 A1* | 6/2003 | Brakmo | G06F 1/3203 713/320 |
| 2007/0015462 A1* | 1/2007 | Dean | H04B 7/15557 455/15 |
| 2013/0072112 A1* | 3/2013 | Gunnarsson | H04B 7/2606 455/9 |
| 2015/0382436 A1 | 12/2015 | Kelly et al. | |
| 2016/0088112 A1 | 3/2016 | Kim | |
| 2016/0134438 A1 | 5/2016 | Marzetta et al. | |
| 2016/0294441 A1* | 10/2016 | Fazlollahi | H04B 3/36 |
| 2016/0357626 A1 | 12/2016 | Kim et al. | |
| 2017/0280472 A1* | 9/2017 | Gupta | H04L 5/0007 |
| 2017/0353819 A1* | 12/2017 | Yin | H04L 47/30 |
| 2018/0110000 A1* | 4/2018 | Shellhammer | H04W 52/0206 |
| 2018/0234524 A1* | 8/2018 | Cheng | H04W 40/12 |
| 2018/0255552 A1* | 9/2018 | Luo | H04W 72/0453 |

* cited by examiner

*Primary Examiner* — Robert J Lopata
(74) *Attorney, Agent, or Firm* — Kilpatrick Townsend & Stockton LLP

(57) ABSTRACT

RF repeaters may be used to extend coverage of an IoT system. Further, small base stations, commonly referred to as small cells, may be use to provide local coverage. When small cells are used, the issue of power consumption is addressed as these systems could often be remotely located and may be running off of battery power or some renewable power source.

9 Claims, 2 Drawing Sheets

LOW POWER CELLULAR BASE STATION

CROSS REFERENCE TO RELATED APPLICATIONS

This application claims the benefit of priority of U.S. Provisional Application Ser. No. 62/530,023, filed Jul. 7, 2017, titled "Low Power Cellular Base Station", the disclosure of which is hereby incorporated by reference in its entirety herein.

BACKGROUND

Networks of devices that connect machines to the Internet are becoming increasingly popular. Commonly such networks are known as IoT (Internet-of-Things) networks. Within an IoT network, IoT nodes (which are very often battery powered) typically measure physical values (such as a temperature, or a number of items, for example), and then either: store the value(s) locally; transmit the value(s) to the Internet; analyze the value and make a local decision if an action is required based on the value(s), and if the action must be reported to the Internet; or any combination of the above.

IoT networks have a few important characteristics. They must be able to operate over a very long range, and must be able to operate with very low power consumption.

A number of different network technologies are currently being used to deploy IoT networks. These include LoRa, SigFox, LTE CAT-M1 and NB-IoT. These networks have been specifically designed to address the two characteristics noted above. Also, the network types can be split into two broad categories, namely cellular-based systems and other systems. Cellular systems include LTE CAT-M1 and NB-IOT systems, and are characterized by the use of cellular networking standards and technologies to implement the IOT networks, and which are the focus of this document.

One aspect related to a cellular network base station is that the network is always ON. Typically the base station is always transmitting common control and pilot channels in the downlink direction, even if there is no uplink traffic present. This allows for user devices to be contactable at any time and, conversely, for user devices to be able to send messages via the base station at any time. Normally this is the desired behavior for a cellular system. Even in the case of an IoT system that either shares common cellular networking infrastructure with normal cellular traffic, or in the case of purposefully built IoT cellular system, this is generally the desired behavior as the coverage area of such a system is very large, and thousands of devices can be addressable in the coverage area of the base station via the network.

However, even with the large coverage area provided by cellular base stations, it is well known that coverage is often inadequate due to either distance from the base station or due to signal propagation impairment by walls and buildings.

SUMMARY

To resolve these low signal issues, two basic approaches may be taken. First, RF repeaters may be used to extend coverage and secondly, small base stations, commonly referred to as small cells, may be use to provide local coverage. When small cells are used, the issue of power consumption must be addressed as these systems could often be remotely located and may be running off of battery power or some renewable power source.

In some aspects, a system is disclosed for extending coverage of an Internet of Things (IoT) network having one or more IoT nodes, each of the one or more IoT nodes having a sensor to sense a value in a local environment, a sensor processor to generate information representing the value, and a modem to communicate the information to the Internet. The system includes a small cell radio frequency (RF) repeater that is positioned within the local environment and configured to receive the information communicated from the modem of the IoT node associated with the local environment. The small cell RF repeater is configured by a schedule to alternate between an OFF or a low-power mode and an ON mode to be able to receive the information communicated from the modem of the IoT node associated with the local environment. The system further includes a small cell evolved packet core in communication with the small cell RF repeater to receive the information from the small cell RF repeater, and in communication with the IoT network via a wireless link to transmit the information from the small cell RF repeater to the IoT network.

In other aspects, a system includes a relay that is positioned within the local environment. The relay includes a small cell radio frequency (RF) repeater configured to receive the information communicated from the modem of the IoT node associated with the local environment. As above, the small cell RF repeater can be configured by a schedule to alternate between an OFF or a low-power mode and an ON mode to be able to receive the information communicated from the modem of the IoT node associated with the local environment, the relay further comprising a wireless modem for transmitting the information received by the small cell RF repeater.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes radio frequency (RF) repeaters that may be used to extend coverage and secondly, small base stations, commonly referred to as small cells, which can be used to provide local coverage for a cellular-based IOT network. When small cells are used, the issue of power consumption is addressed as these systems can often be remotely-located from each other, and may be running off battery power or some renewable power source, rather than directly from the grid.

Accordingly, this document describes an IoT small cell or IoT relay that can be switched on and off based on whether or not signal coverage is required at the time. Also described is an IoT small cell or IoT relay that receives a schedule from devices connecting through the relay or small cell to the network of when the small cell or relay must be turned ON to provide coverage. In further implementations, an IoT small cell or IoT relay is provided that receives a schedule from devices connecting through the relay or small cell to the network of when the booster must be turned ON and provide coverage where the schedule is delivered to the booster using a short range wireless link.

Figure 1:
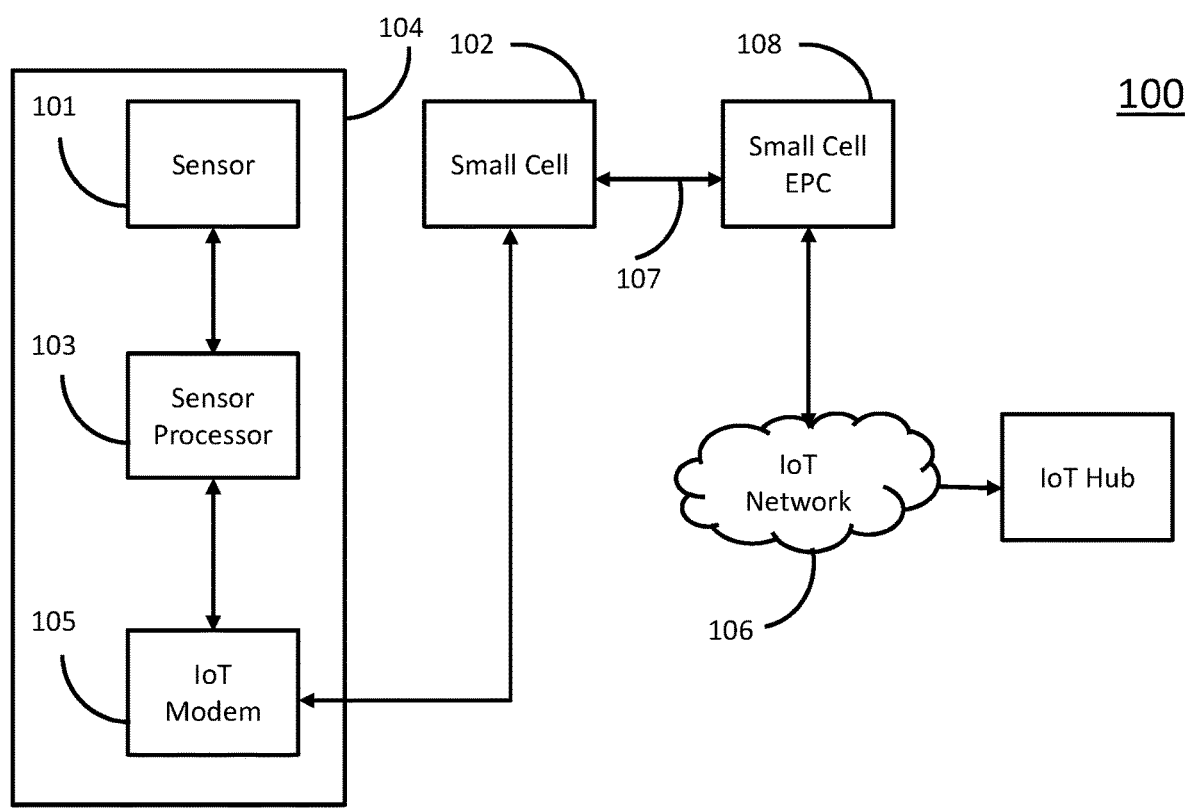
FIG. 1 illustrates an IOT system with a small cell providing coverage.

Two system architectures are shown below in FIG. 1 and FIG. 2 as exemplary systems 100 and 200, respectively; however, other architectures may also be possible. In FIG. 1, an IOT node 104 includes a sensor 101 for sensing a value of a physical thing, such as a temperature, a quantity, a presence of an object, etc. The IOT node 104 further includes a sensor processor 103 for processing the sensed value from the sensor 101 to generate information representing the value(s), and an IOT modem 105 to transmit the value(s) the Internet, for delivery to a server or other computer or device, such as a cloud storage.

As shown in FIG. 1, a small cell 102 providing the coverage for the IoT Node 104 is connected to the core network 106 via a small cell Evolved Packet Core (EPC) 108 directly, using a wired Internet connection 107, for example. The small cell EPC is then in turn connected the IoT network 106 and an IoT Hub 110 to store the information, such as the value(s), from the IoT node 104 and to execute appropriate actions.

Figure 2:
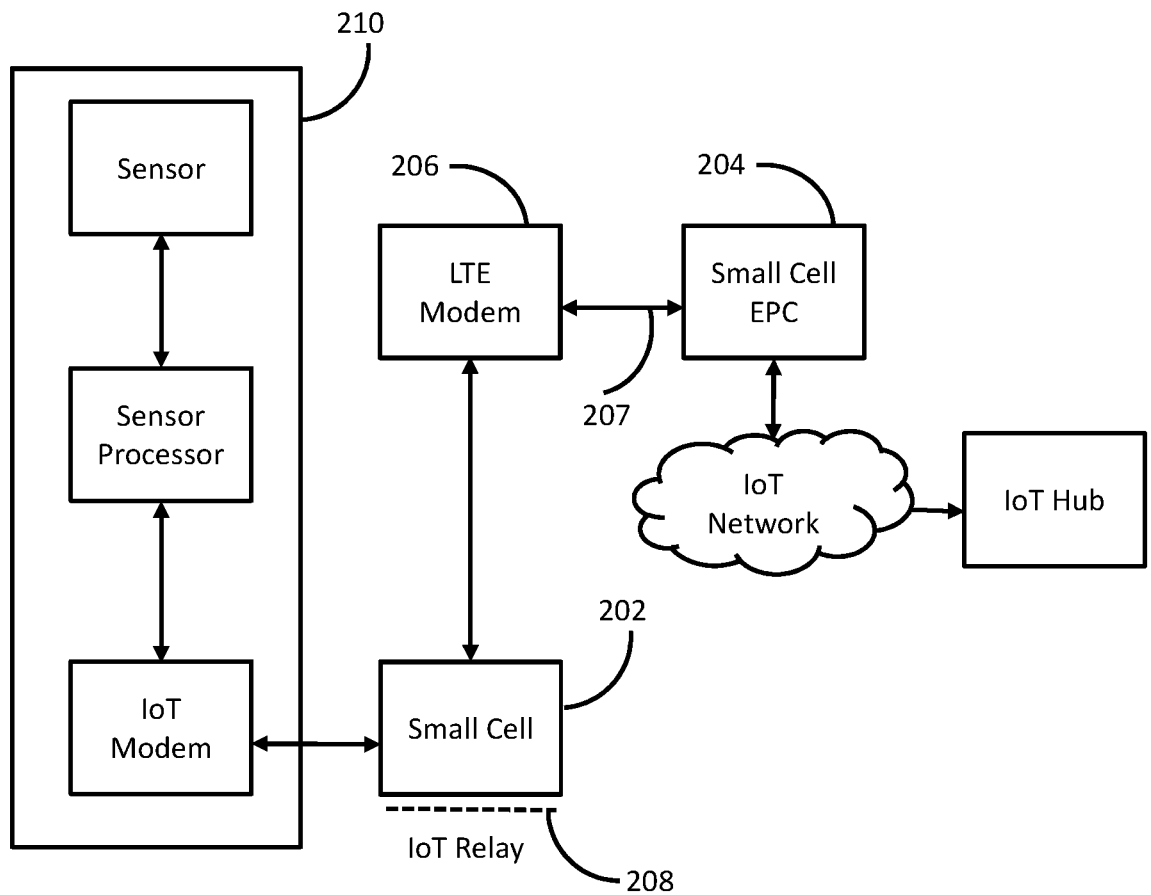
FIG. 2 illustrates an IOT system with a relay providing coverage.

In the exemplary system 200 shown in FIG. 2, a small cell 202 is connected to a Small Cell EPC 204 using a wireless link 206, such as an LTE modem or the like. The combination of a small cell 202 and wireless modem for backhaul connectivity is commonly referred to as a relay 208. In order to reduce the power consumption of the overall IOT solution, the power consumption of the small cell 202 or the relay 208 must also be addressed. This can be done by switching the small cell 202 or relay 208 off, or to a low-power standby mode, whenever the coverage is not required by the TOT Node(s) 210 using the small cell 202 or relay 208 for coverage.

In some implementations, an IoT small cell or IoT relay receives a schedule from devices connecting through the relay or small cell to the network, where the schedule provides times when the booster must be turned ON and provide coverage, and where the schedule is delivered to the booster using a short range wireless link. An IoT relay system can incorporate a wireless modem, and where a wake-up schedule for the relay is determined by the wake-up schedule for an incorporated wireless modem.

In some implementations, a processing system is provided that can combine the wake-up schedules of multiple IoT Nodes as well as the small cell or relay into a single wake-up schedule design to optimize the power efficiency of the system. In some exemplary implementations, a system that synchronizes the wake-up schedule of a number of devices connected to a small cell or relay in order to reduce the time the booster must be awake and relaying a signal.

In yet other implementations, a sensor processor is provided that synchronizes its processing activity with the On/Off schedule of the IoT Node. Such a sensor processor can synchronize its processing activity with the On/Off schedule of the small cell or relay it uses to connect to the network.

In yet other implementations, a system is provided where the operating frequency of the small cell is selected on every wake-up cycle and where it may be different between different wake-up cycles. In exemplary implementations, a system is provided where an IoT Node will search for the correct small cell frequency to be "camped" on, on every wake-up cycle.

Accordingly, RF repeaters may be used to extend coverage of an IoT system. Further, small base stations, commonly referred to as small cells, may be use to provide local coverage in an IoT network. When small cells are used, the issue of power consumption is addressed as these systems could often be remotely located and may be running off of battery power or some renewable power source other than energy from the grid.

Although a few embodiments have been described in detail above, other modifications are possible. Other embodiments may be within the scope of the following claims.

The invention claimed is:

1. A system for extending coverage of an Internet of Things (IoT) network having one or more IoT nodes, each of the one or more IoT nodes having a sensor to sense a value in a local environment according to a sensing schedule, a sensor processor to generate information representing the value, and a modem to communicate the information to the Internet, the system comprising:
 a small cell radio frequency (RF) repeater that is positioned within the local environment and configured to receive the information communicated from the modem of the IoT node associated with the local environment, the small cell RF repeater being configured by a schedule to alternate between an OFF or a low-power mode and an ON mode to be able to receive the information communicated from the modem of the IoT node associated with the local environment, the schedule being synchronized with the sensing schedule of each of the one or more IoT nodes; and
 a small cell evolved packet core in communication with the small cell RF repeater to receive the information from the small cell RF repeater, and in communication with the IoT network via a wireless link to transmit the information from the small cell RF repeater to the IoT network.

2. The system in accordance with claim 1, wherein the small cell evolved packet core is in communication with the small cell RF repeater via a wired connection.

3. The system in accordance with claim 1, wherein the small cell evolved packet core is in communication with the small cell RF repeater via a wireless link.

4. The system in accordance with claim 1, wherein the small cell evolved packet core is in communication with the small cell RF repeater via an LTE modem.

5. The system in accordance with claim 4, wherein the LTE modem and the small cell RF repeater are packaged into a common housing that forms a relay.

6. A system for extending coverage of an Internet of Things (IoT) network having one or more IoT nodes, each of the one or more IoT nodes having a sensor to sense a value in a local environment according to a sensing schedule, a sensor processor to generate information representing the value, and a modem to communicate the information to the Internet, the system comprising:
 a relay that is positioned within the local environment, the relay comprising a small cell radio frequency (RF) repeater configured to receive the information communicated from the modem of the IoT node associated with the local environment, the small cell RF repeater being configured by a schedule to alternate between an OFF or a low-power mode and an ON mode to be able to receive the information communicated from the modem of the IoT node associated with the local environment, the schedule being synchronized with the sensing schedule of each of the one or more IoT nodes, the relay further comprising a wireless modem for transmitting the information received by the small cell RF repeater; and a small cell evolved packet core in communication with the wireless modem of the relay to receive the information from the small cell RF repeater, and in communication with the IoT network via a wireless link to transmit the information from the small cell RF repeater to the IoT network.

7. The system in accordance with claim 6, wherein the wireless modem of the relay includes an LTE modem.

8. The system in accordance with claim 6, wherein the schedule includes a regular wake-up schedule to turn the small cell RF repeater to the ON mode.

9. The system in accordance with claim 6, wherein the schedule includes an operating frequency that is synchronized with the IoT node.

* * * * *